United States Patent
Shamis et al.

(10) Patent No.: US 11,308,203 B2
(45) Date of Patent: Apr. 19, 2022

(54) SIDE-CHANNEL PROTECTION

(71) Applicant: Microsoft Technology Licensing, LLC, Redmond, WA (US)

(72) Inventors: Alexander Shamis, Cambridge (GB); Sylvan Wesley Clebsch, Cambridge (GB); Felix Schuster, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 540 days.

(21) Appl. No.: 16/246,434

(22) Filed: Jan. 11, 2019

(65) Prior Publication Data
US 2020/0226248 A1    Jul. 16, 2020

(51) Int. Cl.
*G06F 21/53*    (2013.01)
*G06F 12/10*    (2016.01)
*G06F 21/57*    (2013.01)

(52) U.S. Cl.
CPC .............. *G06F 21/53* (2013.01); *G06F 12/10* (2013.01); *G06F 21/57* (2013.01); *G06F 2212/1052* (2013.01); *G06F 2212/657* (2013.01); *G06F 2221/034* (2013.01); *G06F 2221/2149* (2013.01)

(58) Field of Classification Search
CPC .......... G06F 21/53; G06F 12/10; G06F 21/57; G06F 2212/1052; G06F 2212/657; G06F 2221/034; G06F 2221/2149; G06F 9/5061; G06F 9/544; G06F 21/556; G06F 21/75; G06F 21/74
USPC ........................................................ 726/22
See application file for complete search history.

(56) References Cited

U.S. PATENT DOCUMENTS

| 2011/0302425 | A1* | 12/2011 | Saripalli | G06F 21/57 713/189 |
| 2016/0283402 | A1* | 9/2016 | Schulz | G06F 11/0757 |
| 2017/0090800 | A1* | 3/2017 | Alexandrovich | G06F 21/78 |
| 2018/0324052 | A1* | 11/2018 | Nachimuthu | H04Q 9/00 |

OTHER PUBLICATIONS

"International Search Report and Written Opinion Issued in PCT Application No. PCT/US19/065312", dated Feb. 25, 2020, 13 Pages.
Sartakov, et al. "STANlite—A Database Engine for Secure Data Processing at Rack-Scale Level", In Proceedings of the IEEE International Conference on Cloud Engineering, Apr. 17, 2018, pp. 23-33.

(Continued)

*Primary Examiner* — Mohammad W Reza (57) ABSTRACT

In various examples there is a computing device in communication with at least one other computing device via a communications network. The computing device has a memory and a central processing unit having a trusted execution environment comprising trusted regions of the memory. The computing device has an operating system configured to create a memory mapping between a virtual address space of the memory and a memory of the at least one other computing device and to provide details of the memory mapping to the trusted execution environment. The trusted execution environment is configured to execute an application which is able to communicate with the other computing device directly using the memory mapping provided by the operating system.

20 Claims, 8 Drawing Sheets

(56) References Cited

OTHER PUBLICATIONS

Oleksenko, et al. "Varys: Protecting SGX Enclaves From Practical Side-Channel Attacks", In Proceedings of the USENIX Annual Technical Conference, Jul. 2018, pp. 227-239.
"Remote Direct Memory Access", Retrieved From: https://en.wikipedia.org/w/index.php?title=Remote_direct_memory_access&oldid=855187693, Aug. 16, 2018, 3 Pages.

* cited by examiner

SIDE-CHANNEL PROTECTION

BACKGROUND

Side-channel attacks involve obtaining information about sensitive code by observing effects of the sensitive code.

Many different types of side-channel attack have been found to occur against sensitive code. Previous attempts to mitigate such attacks are often bespoke to a particular type of side-channel attack which makes it difficult to give comprehensive protection.

The embodiments described below are not limited to implementations which solve any or all of the disadvantages of known side-channel attack protection mechanisms.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a computing device in communication with at least one other computing device via a communications network. The computing device has a memory and a central processing unit having a trusted execution environment comprising trusted regions of the memory. The computing device has an operating system configured to create a memory mapping between a virtual address space of the memory and a memory of the at least one other computing device and to provide details of the memory mapping to the trusted execution environment. The trusted execution environment is configured to execute an application which is able to communicate with the other computing device directly using the memory mapping provided by the operating system.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The inventors have recognized that side-channel attacks in multi-core processors, involve malicious code being able to observe effects of sensitive code on shared resources of the multi-core processor. Multi-core processors are widely used in data centers and other deployments and often there are multiple data center tenants or other users. A malicious tenant using one core of a multi-core processor might be able to obtain information about sensitive code executing on one of the other cores by observing effects on shared resources. Side-channel attacks are a significant problem where security is important, such as where sensitive code is being executed.

An example side-channel attack in a multi-core processor is now described. Suppose that there are two cores in a multi-core processor and the cores are isolated in different privilege domains so that code executing on a first one of the two cores is isolated from code executing on a second one of the two cores. Suppose that the first core executes sensitive code and that the second core executes malicious code. Shared resources of the multi-core processor are shared by the first and second cores and are used during execution of the first and second code. The malicious code is able to observe effects of the first code on the shared resources and it is able to use the observations to make inferences about the first code. In this way the malicious code is able to gain knowledge about the sensitive code.

The inventors have recognized that trusted execution environments are typically designed to protect against conventional attacks, such as where an operating system is compromised, and are generally not able to protect against side-channel attacks. The inventors also recognize that using a trusted execution environment on the multi-core processor brings drawbacks since it makes it in-efficient to enable the code executing within the trusted execution environment to communicate with entities outside the trusted execution environment in an efficient manner. The inventors have recognized this problem and have developed a way of enabling efficient communication between code executing in the trusted execution environment of the multi-core processor and one or more remote computing devices. In various embodiments the processes executing in the trusted execution environment are able to make direct memory accesses to a one or more remote computing devices. To achieve the direct memory access the trusted execution environment uses a mapping between virtual memory of a computing device which hosts the trusted execution environment and memory of the remote computing device. The mapping is established by an operating system of the computing device which hosts the trusted execution environment. It is not necessary for the operating system of the multi-core processor to be trusted, since if the memory mapping is not done, or is done incorrectly, there is a denial of service attack which is detected using conventional denial of service attack detection mechanisms and conventional algorithms are used to prevent the computing device from communicating with some or all other devices.

The trusted execution environment and the operating system of the disclosure operate in an unconventional manner to achieve side-channel attack mitigation whilst being efficient.

The trusted execution environment and the operating system improve the functioning of the underlying computing device by executing an application in the trusted execution environment which is able to communicate with a remote computing device directly using a memory mapping provided by the operating system.

Figure 1:
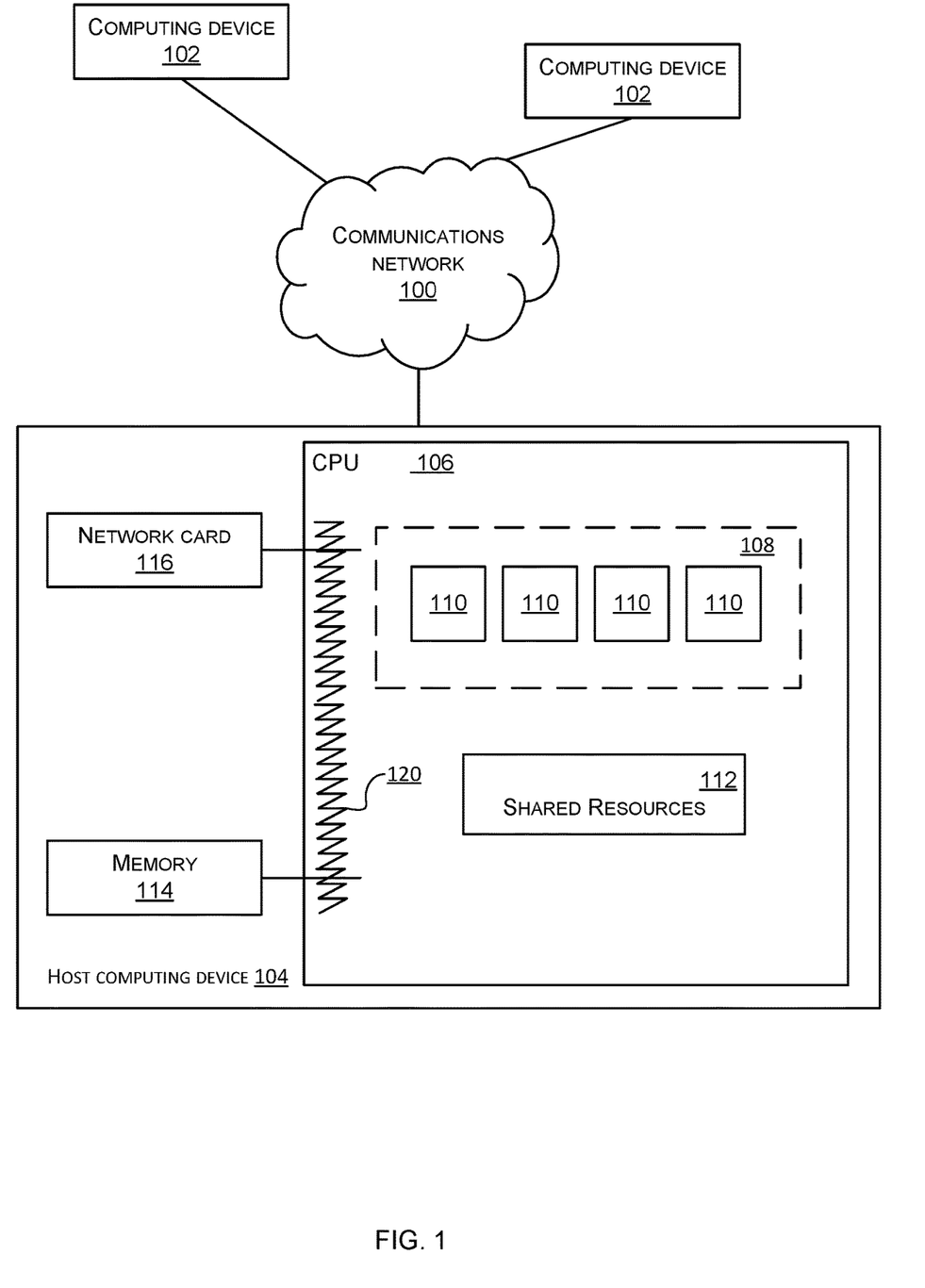
FIG. 1 is a schematic diagram of a computing device 104 having a trusted execution environment.

FIG. 1 illustrates a computing device 104 which has a trusted execution environment 108 on a central processing unit 106. The trusted execution environment is implemented using hardware or in any other suitable way. In this example, four processing cores 110 are shown within the trusted execution environment but it is not essential to use four processing cores 110. There is a plurality of processing cores. The computing device 104 has shared resources 112 which are shared by the processing cores 110. The shared resources comprise memory and/or registers. A non-exhaustive list of examples of shared resources 112 is: microarchitectural buffer such as a buffer used for the prediction of branch targets, register, cache, memory, persistent storage.

The central processing unit 106 is connected to memory 114 and also to a network card 116. Other components of the computing device 104 are omitted for clarity in FIG. 1 and later in this document a detailed example of a suitable computing device 104 is given with reference to FIG. 8. The network card 116 enables the computing device to communicate with one or more other remote computing devices 102 via a communications network 100 of any suitable type. A remote computing device 102 is any computing device separate from computing device 104 so that a remote computing device 102 is physically proximate to computing device 104 in some examples. Memory 114 is any suitable off-chip memory such as dynamic random access memory (DRAM), non-volatile memory or other memory.

Encryption is used such that code and data on the memory 114 is encrypted. Zig-zag line 120 in FIG. 1 denotes an encryption barrier which schematically represents the fact that, from the point of view of any entity except the CPU the memory is encrypted. Hardware and/or software encryption is used according to any well-known encryption technique.

An operating system of the computing device 104 (not shown in FIG. 1) creates a memory mapping from virtual memory of the computing device 104 to memory of one or more of the remote computing devices 102. The trusted execution environment is configured so that code executing within it uses the memory mapping created by the operating system in order to directly access memory of one or more of the remote computing devices (that is, without going via the operating system). In some examples either a kernel-by pass method, or a user-space device driver process is used to implement the direct memory access.

A core that is running in the trusted execution environment 108 will not launch a side-channel attack, because the code on that core is controlled by the party controlling the trusted execution environment. This is because the risk of malicious code being present is reduced significantly since only trusted code is placed within the trusted execution environment. A method of mitigating side-channel attacks whilst improving performance regarding direct memory access of remote computing devices is described below with reference to FIG. 3.

Figure 1A:
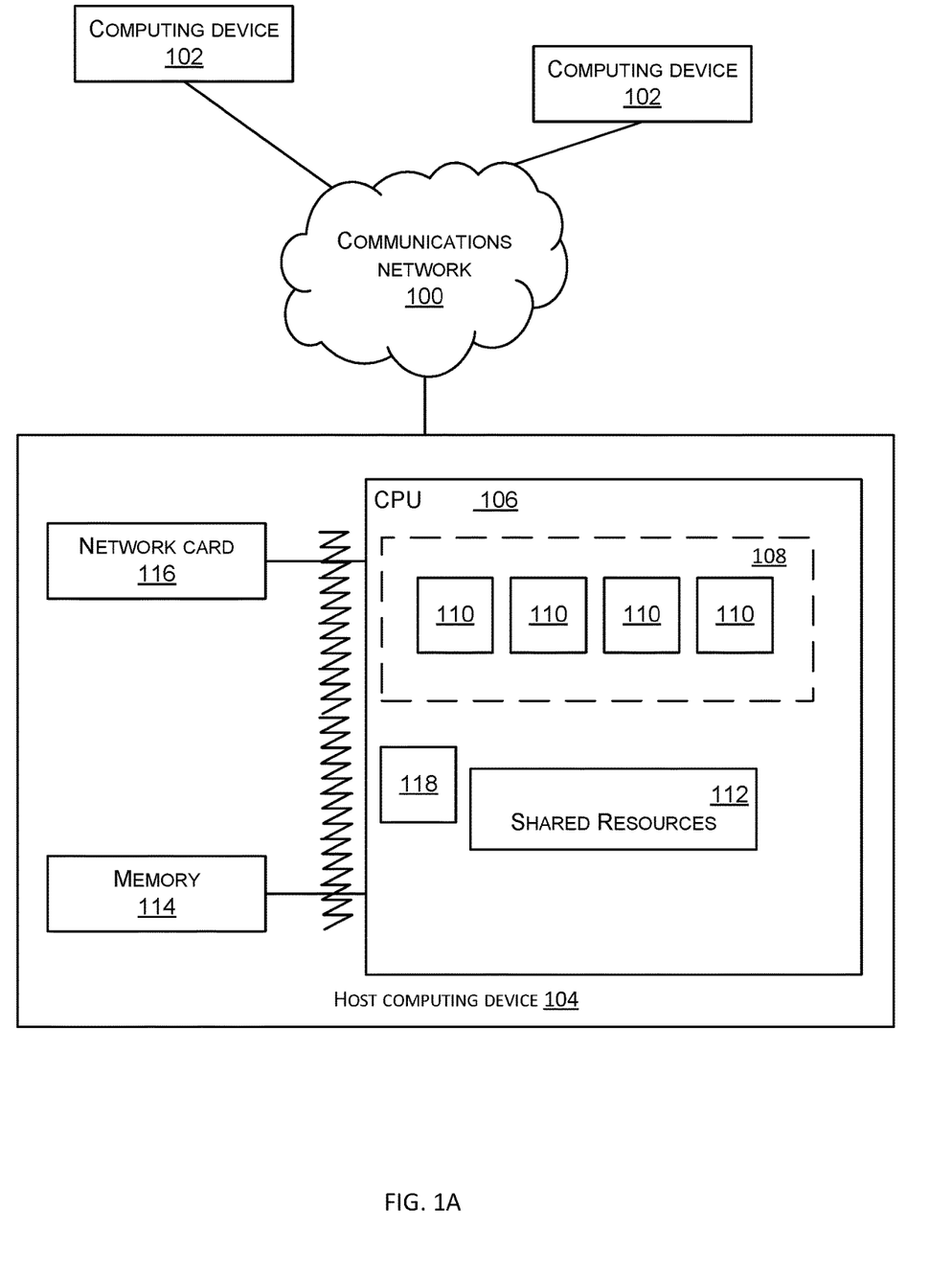
FIG. 1A is a schematic diagram of another computing device having a trusted execution environment.

The inventors have recognized that even where a trusted execution environment is used, there is a possibility of side channel attacks where malicious code executes on a core outside the trusted execution environment as now explained with reference to FIG. 1A. FIG. 1A is the same as FIG. 1 except for the addition of a core 118 on the central processing unit 106, but outside the trusted execution environment 108. Suppose that a malicious party has code executing on core 118 of the central processing unit 106 where core 118 is outside the trusted execution environment. Sensitive code is executing on one or more of the cores 110 within the trusted execution environment. The shared resources 112 of the central processing unit 106 are used by the code executing on the core 118 outside the trusted execution environment as well as by the sensitive code executing within the trusted execution environment. The malicious party is able to design the code executing on the core 118 so that it observes effects of the sensitive code on the shared resources 112 and so is able to make inferences about the sensitive code. Various different ways of designing the code executing on the core 118 enable different types of side-channel attack.

There are various ways in which malicious code can begin executing on a core outside of the trusted execution environment. In an example, an event happens at the network interface card such as arrival of a communication, the network interface card sends an interrupt to the operating system of the computing device 104. The computing device then allocates one of the cores of the computing device for executing a process outside the trusted execution environment in order to deal with the incoming communication. Potentially the process now executing outside the trusted execution environment is malicious and it is able to observe the shared resources 112 and make inferences about the sensitive code executing in the trusted execution environment.

In various examples, side-channel attacks are prevented in the scenario of FIG. 1A by making execution of code within the trusted execution environment atomic, in the sense that execution of code within the trusted execution environment occurs only when the sensitive code knows there is control over all active cores. Any sensitive data in shared resources of the computing device is flushed on entry to the atomic execution and on exit of the atomic execution in order to enhance security. The atomicity is over a plurality of cores where those cores are inside the trusted execution environment. Various different ways of achieving the atomicity are possible as described with reference to FIGS. 4 to 6.

Figure 2:
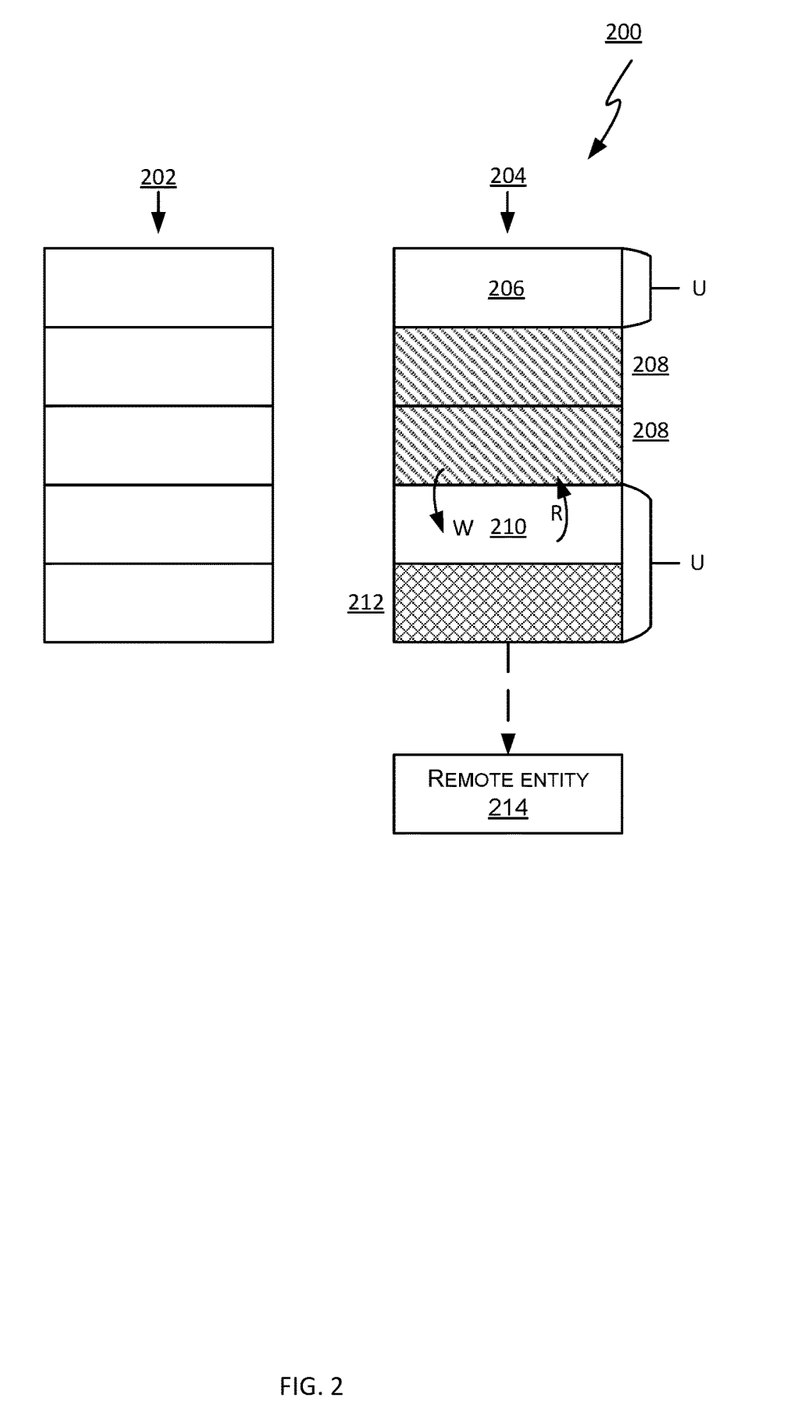
FIG. 2 is a schematic diagram of a virtual memory address space of the computing device of FIG. 1.

In the embodiments described herein the operating system is configured to create a memory mapping as explained with reference to FIG. 2. The trusted execution environment 108 is part of one or more conventional processes (a process here is a software execution process). Each conventional processes has its own address space crafted by the operating system of the computing device 104. FIG. 2 is a schematic diagram of the address space of a process 200 such as a word processing application which is being executed. The address space comprises a plurality of pages of virtual memory which map to physical memory. In FIG. 2 there are two columns 202, 204 of virtual memory pages. Some but not all of the pages of virtual memory are within the trusted execution environment and are trusted; these pages are illustrated in FIG. 2 as cross-hatched regions 208 and are the trusted address space. Others of the pages of virtual memory are outside the trusted execution environment and are untrusted; these pages are illustrated in FIG. 2 as region 206, 210, 212 and are the untrusted address space. The parts of the process which execute in the trusted execution environment are able to read and write the untrusted pages as indicated by the arrows in page 210 of FIG. 2. But everything that runs outside the trusted execution environment cannot look inside the memory regions 208 of the trusted execution environment.

The operating system is configured to map a physical device, such as a network interface card, a graphics card, or a remote direct memory access (RDMA) interface as part of the untrusted address space 212. In this way there is a memory mapping to a remote computing device as illustrated in FIG. 1. This gives the benefit that the trusted execution environment is able to communicate directly with the remote computing device without having to ask the operating system to take care of the communication on its behalf. The result is a highly efficient way of enabling execution in the trusted execution environment to proceed when communicating with remote computing devices.

Figure 3:
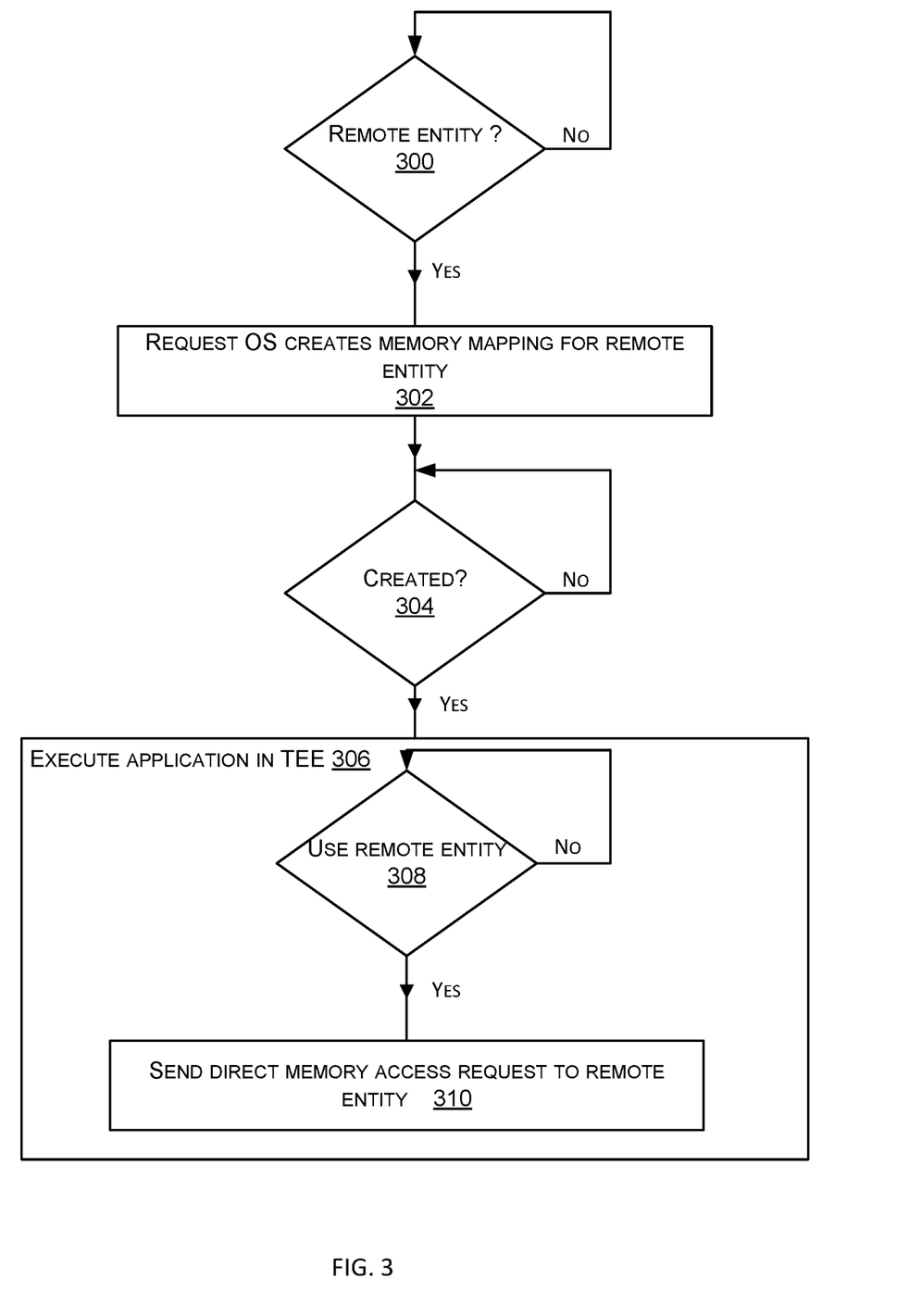
FIG. 3 is a flow diagram of a method of enabling software executing in the trusted execution environment to communicate with a remote computing device and with side-channel protection under some circumstances.

FIG. 3 is a flow diagram of an example process carried out by sensitive code executing in the trusted execution environment 108 of FIG. 1. In this example, side-channel protection is given to some extent but is not fully guaranteed. Some side-channel protection is given because the code running in the cores is initially within the trusted execution environment and so is under the control of the party who operates the trusted execution environment. However, protection is not fully guaranteed because a malicious party is able to introduce a process in a core outside the trusted execution environment.

The sensitive code identifies 300 that it expects to make a read or write to a remote entity and it requests 302 the operating system to create a memory mapping for the remote entity. The sensitive code does this for each remote entity that it expects to make a read or write to. The operating system sends messages back to the sensitive code to indicate that the memory mapping has been done and with details about the memory mapping. The sensitive code checks 304 that it has received confirmations from the operating system for all the memory mappings it wants. If these are not received it returns to operation 302 and makes a request to the operating system. If the confirmations have been received it proceeds to execute 306 the sensitive application in the trusted execution environment. If an execution step needs use of a remote entity at check 308 the sensitive code sends a direct memory access request from within the trusted execution environment direct to the remove entity. It is possible to do this since the operating system has already set up the appropriate memory mapping.

The direct memory access request is made using the memory mapping created by the operating system and using any suitable direct memory access process such as a kernel by-pass process or a user-space device driver process. In the case that a user-space device driver process is used then, after the operating system establishes a connection between the host computing device and a remote computing device, a user-space driver is executed in the trusted execution environment (TEE) to communicate between the host computing device and the remote computing device. In some examples the user-space driver maps virtual memory to the remote computing device.

The method of FIG. 3 gives some protection against side-channel attacks since the trusted execution environment is used. It also gives significant performance improvements since code executing in the trusted execution environment is able to make direct memory accesses to remote computing devices.

Figure 4:
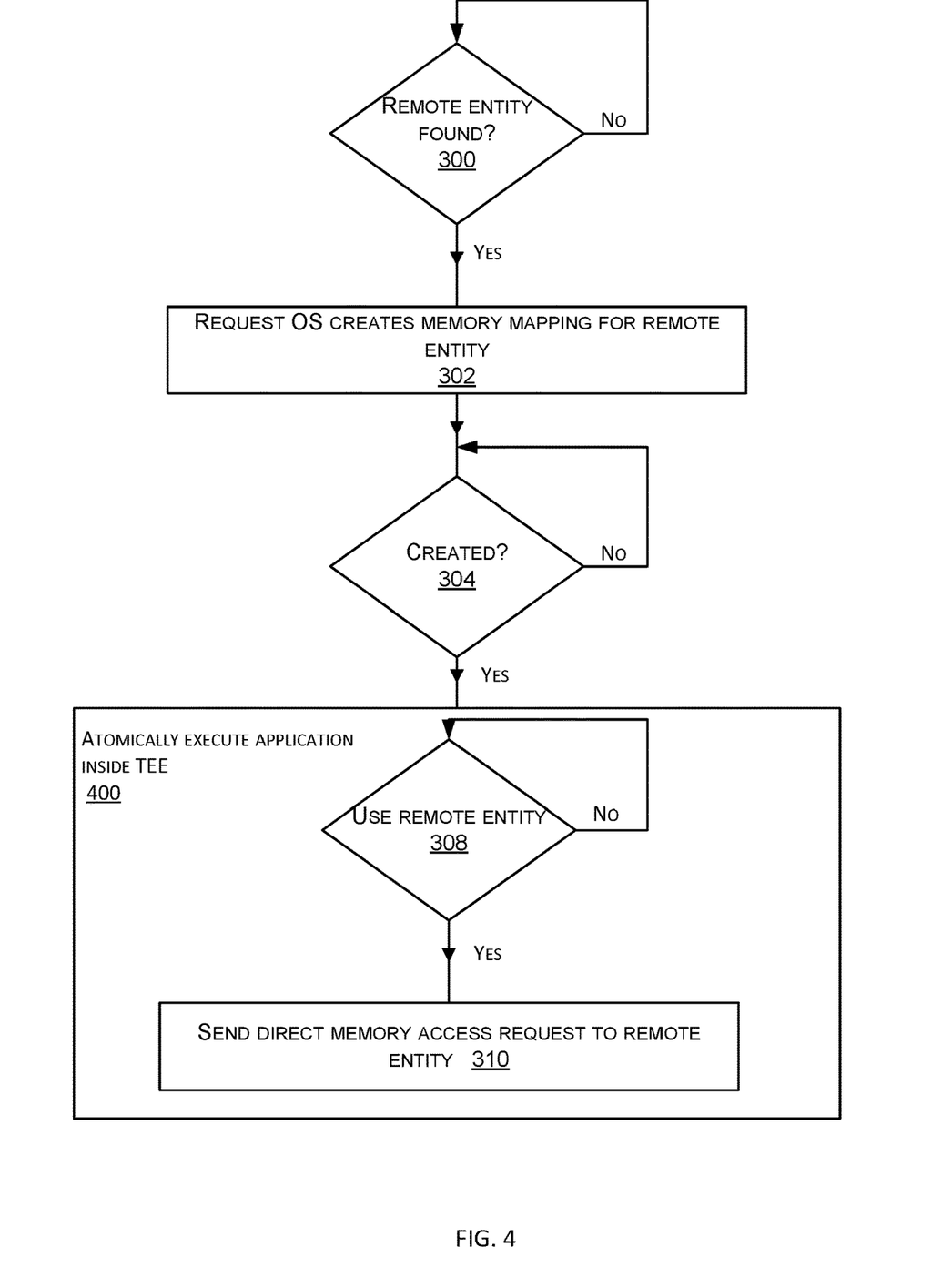
FIG. 4 is the flow diagram of FIG. 3 and with side-channel protection through atomic execution within the trusted execution environment.

FIG. 4 is a flow diagram of an example process carried out by sensitive code executing in the trusted execution environment 108 of FIG. 1A. In this case atomicity is implemented in order to prevent side-channel attacks from untrusted code executing on cores outside the trusted execution environment. Operations 300, 302 and 304 are the same as described above for FIG. 3. Once the memory mappings have been created by the operating system, the sensitive code executes itself atomically 400 within the trusted execution environment across one or more of the cores inside the trusted execution environment. The atomicity means that other processes are prevented from, or are unable to, execute on the computing device at the same time as the execution of the sensitive code. If the sensitive code wants to read or write to one of the remote entities at check 308 it sends a direct memory access request to the remote entity at operation 310. Operation 310 is the same as described above for FIG. 3.

Figure 5:
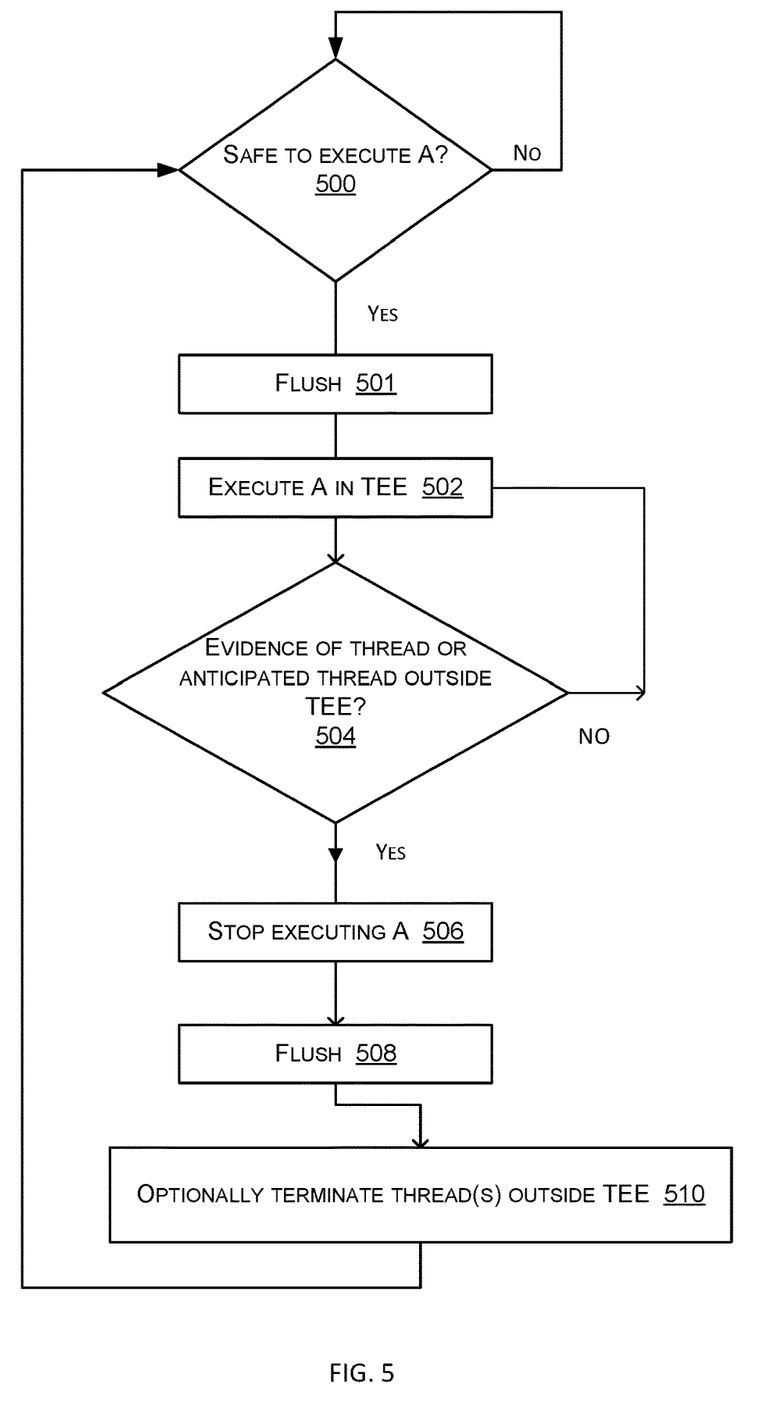
FIG. 5 is a flow diagram of a method of achieving atomicity.

In order to achieve the atomicity of execution of the sensitive code the method of FIG. 5 is used. The method of FIG. 5 is performed by the application which comprises the sensitive code and/or by the trusted execution environment.

With reference to FIG. 5 the sensitive code A decides whether it is safe to execute 500. In an example it decides that it is safe to execute when it has sufficient evidence that all the processor's cores execute within the same TEE as itself. This evidence may come directly from the processor and in a non-limiting example, where the trusted execution environment comprises an enclave, the evidence may come from the enclave.

Once the sensitive code A has decided that it is safe to execute it optionally triggers a flush 501 of caches and micro architecture components in order to guard against asynchronous side-channel attacks. It executes 502 the sensitive code A in the trusted execution environment and monitors 504 for evidence of a thread or anticipated thread execution outside the trusted execution environment. In an example it gains evidence of a thread outside the TEE when it receives an "exit" message from a processor of the trusted execution environment such as CPU 106 of FIG. 1. In another example, it waits to receive a message from the operating system indicating that one of the cores is about to leave the trusted execution environment. Various hybrids or combinations of the methods mentioned above are possible.

When the evidence is received, the sensitive code A stops execution 506 and optionally triggers a flush 508 of the caches and micro architecture components in order to guard against asynchronous side-channel attacks.

Optionally the sensitive code A terminates 510 any threads which are executing outside the TEE using functionality provided by the processor such as CPU 106 of FIG. 1. In this way any potentially malicious threads are unable to execute and threads executing within the TEE are secure from side-channel attacks. Another option is to detect when a thread leaves the TEE and as soon as that happens, to make all the threads leave the TEE so that there is no side-channel protection for any thread. The process returns to operation 500 and repeats.

In one embodiment, hardware modifications are made to a hardware enclave which is the trusted execution environment 108. The hardware modifications configure the enclave to send an "enter" message to the sensitive code indicating that the sensitive code has control over all active cores and to send an "exit" message indicating that the sensitive code is about to lose control over all active cores. The sensitive code monitors for the enter and exit messages. When it receives an enter message it begins execution. When it receives an exit message it stops execution. Optionally it triggers a flush of any data stored in the shared memory which might reveal information to a malicious party, or which might compromise the execution of the sensitive code. The flush is triggered immediately after the enter message is received and before execution begins and is triggered again when the exit message is received.

Figure 6:
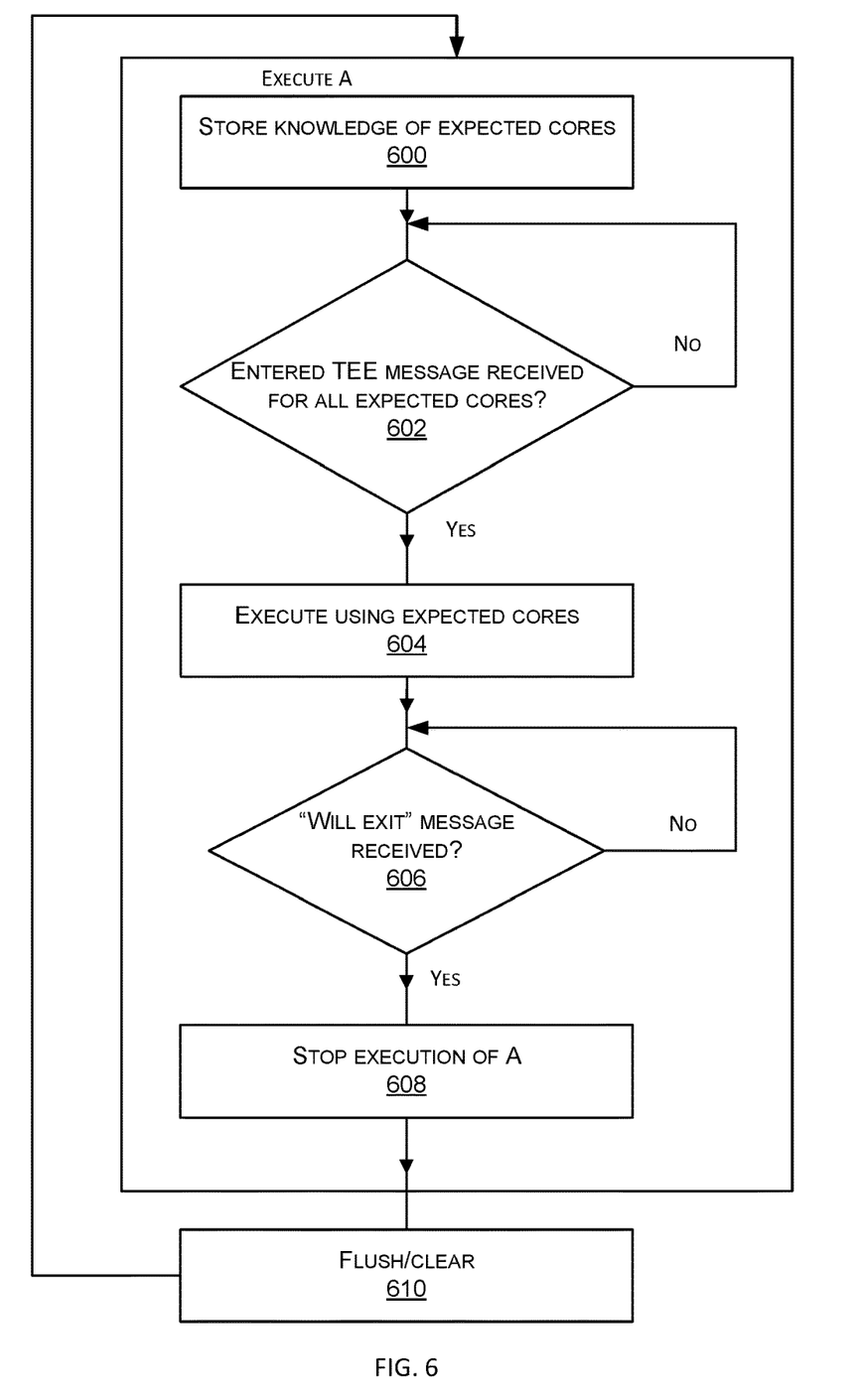
FIG. 6 is a flow diagram of another method of achieving atomicity.

In another embodiment the sensitive code knows the expected number of cores of the trusted execution environment as now described with reference to FIG. 6. The sensitive code executes in the trusted execution environment. It stores knowledge of an expected number of cores to be used in the trusted execution environment. The expected number of cores is less than or equal to the actual number of cores of the computing device. The knowledge is pre-configured by an operator. The sensitive code monitors for "entered TEE" messages from the operating system. It waits until the number of "entered TEE messages it receives is the same as the expected number of cores. It then executes 604 the sensitive code A using the expected number of cores in the trusted execution environment. It monitors 606 for a message from the trusted processor of the TEE indicating that one of the threads will exit the trusted execution environment. When it receives the "will exit" message at operation 606 it stops 608 execution of the sensitive code. Optionally it triggers a flush 610 of the caches and micro architecture components as described above and returns to operation 600 to repeat the method.

Figure 7:
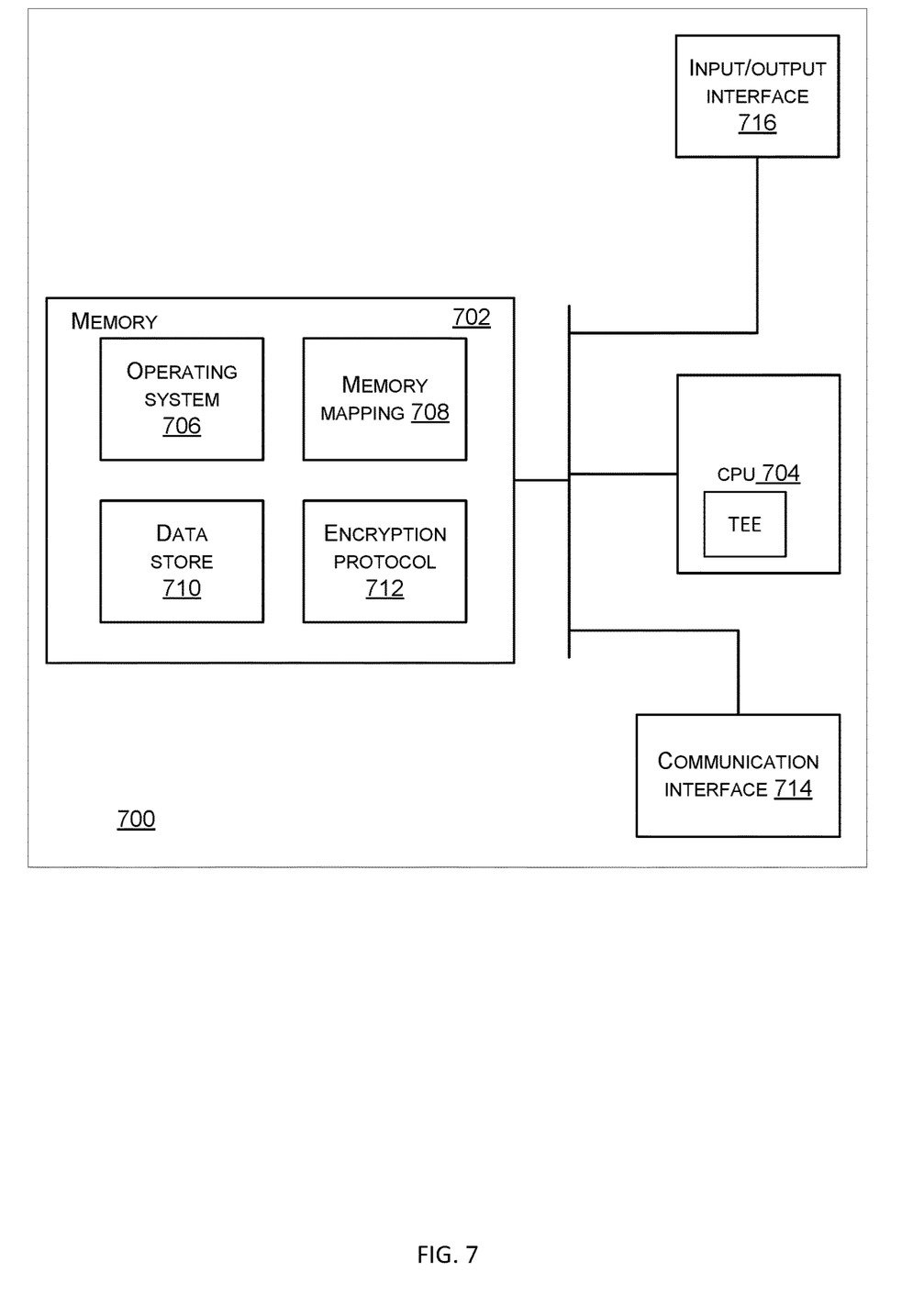
FIG. 7 illustrates an exemplary computing-based device in which embodiments of a trusted execution environment with side-channel protection are implemented.

FIG. 7 illustrates various components of an exemplary computing-based device 700 which are implemented as any form of a computing and/or electronic device, and in which embodiments of a side-channel protector are implemented in some examples.

Computing-based device 700 comprises a central processing unit 704 having a trusted execution environment and a plurality of processors which are any suitable type of processors for processing computer executable instructions to control the operation of the device. The trusted execution environment comprises hardware such as an enclave. Platform software comprising an operating system 706 or any other suitable platform software is provided at the computing-based device. A virtual memory mapping 708 is stored in memory 702 and comprises memory mappings from unsecure memory of the trusted execution environment to one or more remote entities in communication with the computing-based device 700 via communication interface 714. A data store 710 holds knowledge of an expected number of cores of the trusted execution environment. An encryption protocol 712 is used to encrypt data with integrity.

The computer executable instructions are provided using any computer-readable media that is accessible by computing based device 700. Computer-readable media includes, for example, computer storage media such as memory 702 and communications media. Computer storage media, such as memory 702, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 702) is shown within the computing-based device 700 it will be appreciated that the storage is, in some examples, distributed or located remotely and accessed via a network or other communication link (e.g. using communication interface 714 which is a network card in some cases).

The computing-based device 700 also comprises an input/output interface 716 arranged to output display information to a display device which may be separate from or integral to the computing-based device. The display information may provide a graphical user interface. The input/output interface 716 is also arranged to receive and process input from one or more devices, such as a user input device (e.g. a mouse, keyboard, camera, microphone or other sensor). In some examples the user input device detects voice input, user gestures or other user actions and provides a natural user interface (NUI). This user input may be used to select change representations, view clusters, select suggested content item versions. In an embodiment the display device also acts as the user input device if it is a touch sensitive display device. The input/output interface 716 outputs data to devices other than the display device in some examples.

Alternatively, or in addition to the other examples described herein, examples include any combination of the following:

Clause A. A computing device in communication with at least one other computing device via a communications network, the computing device comprising:

a memory;

a central processing unit having a trusted execution environment comprising trusted regions of the memory;

an operating system configured to create a memory mapping between a virtual address space of the memory and a memory of the at least one other computing device and to provide details of the memory mapping to the trusted execution environment;

the trusted execution environment configured to execute an application which is able to communicate with the other computing device directly using the memory mapping provided by the operating system. This provides the benefit of performance improvements as compared with the application having to communicate with the other computing device via the operating system.

Clause B. The computing device of clause A wherein the operating system is configured to create the memory mapping between a virtual address space of untrusted regions of the memory and the memory of the at least one other computing device. In this way the memory mapping is formed in an efficient and effective manner. If the operating system is malicious and does not create the memory mapping, or creates the memory mapping incorrectly, the error is taken care of using any well known cryptographic protocol since the effect is the same as in a denial of service attack.

Clause C. The computing device of clause A or clause B wherein the operating system is configured to create the memory mapping via any one or more of: a network interface card, a graphics card. In this way the network interface card or the graphics card is an intermediary between the computing device and the one or more remote computing devices. User-space device drivers may be used as explained earlier in this document.

Clause D The computing device of any preceding clause wherein the operating system is configured to create the memory mapping for use by a kernel bypass process or using a user-space device driver process. Kernel bypass and user-space device driver are both well known processes and use of either of these processes gives an effective and efficient way of direct memory access.

Clause E The computing device of any preceding clause wherein the operating system is configured to create the memory mapping when it receives a request to do so from an application in the trusted execution environment. As a result, the memory mapping is created on demand.

Clause F The computing device of any preceding clause wherein the computing device has a plurality of processing cores, and wherein an application executing in the trusted execution environment is configured to only proceed to execute sensitive code when it has evidence that it controls all of the processing cores which are active. Thus side-channel attacks are prevented since malicious code is unable to execute on one or more of the processing cores at the same time as the sensitive code.

Clause G The computing device of clause F wherein the trusted execution environment comprises a hardware enclave configured to send a message to the application when all the processing cores are within the trusted execution environment. Using a hardware enclave which is configured in this manner gives an efficient, reliable and secure way of enabling the application to have evidence that it controls all of the processing cores which are active.

Clause H The computing device of clause F or clause G wherein the trusted execution environment comprises a hardware enclave configured to send a message to the application when one of the processing cores is about to leave the trusted execution environment. Using a hardware enclave which is configured in this manner gives an efficient, reliable and secure way of enabling the application to have evidence that it controls all of the processing cores which are active.

Clause I The computing device of clause F wherein the application executing in the trusted execution environment has knowledge of an expected number of the processing cores expected to be within the trusted execution environment during execution of the sensitive code.

Clause J The computing device of clause I wherein the application is configured to compare the expected number of the processing cores with information received from the trusted execution environment and to execute the sensitive code when the expected number of processing cores matches the information received from the trusted execution environment. This gives an efficient, reliable and secure way of enabling the application to have evidence that it controls all of the processing cores which are active.

Clause K The computing device of clause F or clause I or clause J wherein the application executing in the trusted execution environment is configured to stop executing the sensitive code when it receives a message from the trusted execution environment indicating that one of the cores is about to leave the trusted execution environment. This gives an efficient, reliable and secure way of enabling the application to have evidence that it controls all of the processing cores which are active.

Clause L The computing device of any of clauses F to K wherein the application executing in the trusted execution environment is configured to terminate any process executing on a core outside the trusted execution environment. This is a reliable way of enabling the application to have evidence that it controls all of the processing cores which are active.

Clause M The computing device of any of clauses F to L wherein the application executing in the trusted execution environment is configured to flush sensitive data from micro architectural components of the computing device before beginning execution of the sensitive code. This helps to mitigate asynchronous side-channel attacks.

Clause N The computing device of any of clauses F to M wherein the application executing in the trusted execution environment is configured to flush sensitive data from micro architectural components of the computing device when it stops executing the sensitive code. This helps to mitigate asynchronous side-channel attacks. The sensitive data is a direct or indirect result of execution of the sensitive code. For example, the information that a certain execution branch was taken is an indirect result of execution of the sensitive code that may be useful to an attacker.

Clause P A method performed by a computing device in communication with at least one other computing device via a communications network, the method comprising:

using an operating system to create a memory mapping between a virtual address space of a memory of the computing device and a memory of the at least one other computing device; and to providing details of the memory mapping to a trusted execution environment at a central processing unit of the computing device, the trusted execution environment comprising trusted regions of the memory;

executing an application in the trusted execution environment, the application communicating with the other computing device directly using the memory mapping provided by the operating system.

Clause Q The method of clause P comprising only proceeding to execute sensitive code of the application when the trusted execution environment or the application controls all of the processing cores which are active. This prevents side channel attacks as malicious code cannot execute at the same time as the sensitive code.

Clause R The method of clause P or clause Q comprising using a hardware enclave of the trusted execution environment to send a message to the application when all the processing cores are within the trusted execution environment, or when one of the processing cores is about to leave the trusted execution environment.

Clause S The method of clause P or clause Q comprising using knowledge of an expected number of the processing cores expected to be within the trusted execution environment during execution of sensitive code of the application.

Clause T An operating system of a computing device in communication with at least one other computing device via a communications network, the operating system comprising:

software configured to create a memory mapping between a virtual address space of a memory of the computing device and a memory of the at least one other computing device;

software to provide details of the memory mapping to a trusted execution environment of the computing device such that an application executing in the trusted execution environment is able to communicate with the other computing device directly using the memory mapping. This operating system gives performance benefits as compared with when the application in the trusted execution environment has to go via the operating system to communicate with the other computing device.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A computing device in communication with at least one other computing device via a communications network, the computing device comprising:
a memory;
a central processing unit having a trusted execution environment comprising trusted regions of the memory;
an operating system configured to create a memory mapping between a virtual address space of the memory and a memory of the at least one other computing device and to provide details of the memory mapping to the trusted execution environment;
the trusted execution environment configured to execute an application which is able to communicate with the other computing device directly using the memory mapping provided by the operating system; and
wherein the application is configured to flush sensitive data from micro architectural components of the computing device when the application stops executing sensitive code.

2. The computing device of claim 1 wherein the operating system is configured to create the memory mapping between a virtual address space of untrusted regions of the memory and the memory of the at least one other computing device.

3. The computing device of claim 1 wherein the operating system is configured to create the memory mapping via any one or more of: a network interface card, a graphics card.

4. The computing device of claim 1 wherein the application is configured to use the memory mapping in a kernel bypass process or a user-space device driver process.

5. The computing device of claim 1 wherein the operating system is configured to create the memory mapping when it receives a request to do so from an application in the trusted execution environment.

6. The computing device of claim 1 wherein the computing device has a plurality of processing cores, and wherein an application executing in the trusted execution environment is configured to only proceed to execute sensitive code when it has evidence that it controls of all of the processing cores which are active.

7. The computing device of claim 6 wherein the trusted execution environment comprises a hardware enclave configured to send a message to the application when all the processing cores are within the trusted execution environment.

8. The computing device of claim 6 wherein the trusted execution environment comprises a hardware enclave configured to send a message to the application when one of the processing cores is about to leave the trusted execution environment.

9. The computing device of claim 6 wherein the application executing in the trusted execution environment has knowledge of an expected number of the processing cores expected to be within the trusted execution environment during execution of the sensitive code.

10. The computing device of claim 9 wherein the application is configured to compare the expected number of the processing cores with information received from the trusted execution environment and to execute the sensitive code when the expected number of processing cores matches the information received from the trusted execution environment.

11. The computing device of claim 6 wherein the application executing in the trusted execution environment is configured to stop executing the sensitive code when it receives a message from the trusted execution environment indicating that one of the cores is about to leave the trusted execution environment.

12. The computing device of claim 6 wherein the application executing in the trusted execution environment is configured to terminate any process executing on a core outside the trusted execution environment.

13. The computing device of claim 6 wherein the application executing in the trusted execution environment is configured to flush sensitive data from micro architectural components of the computing device before beginning execution of the sensitive code.

14. The computing device of claim 6 wherein the sensitive data is flushed when the sensitive code has decided that it is safe to execute.

15. A method performed by a computing device in communication with at least one other computing device via a communications network, the method comprising:
using an operating system to create a memory mapping between a virtual address space of a memory of the computing device and a memory of the at least one other computing device; and to
providing details of the memory mapping to a trusted execution environment at a central processing unit of the computing device, the trusted execution environment comprising trusted regions of the memory;
executing an application in the trusted execution environment, the application communicating with the other computing device directly using the memory mapping provided by the operating system; and
wherein the application is configured to flush sensitive data from micro architectural components of the computing device when the application stops executing the sensitive code.

16. The method of claim 15 comprising only proceeding to execute sensitive code of the application when the trusted execution environment or the application controls of all of the processing cores which are active.

17. The method of claim 15 comprising using a hardware enclave of the trusted execution environment to send a message to the application when all the processing cores are within the trusted execution environment, or when one of the processing cores is about to leave the trusted execution environment.

18. The method of claim 15 comprising using knowledge of an expected number of the processing cores expected to be within the trusted execution environment during execution of sensitive code of the application.

19. An operating system of a computing device in communication with at least one other computing device via a communications network, the operating system causing one or more processors to perform the following operations:
create a memory mapping between a virtual address space of a memory of the computing device and a memory of the at least one other computing device;
provide details of the memory mapping to a trusted execution environment of the computing device such that an application executing in the trusted execution environment is able to communicate with the other computing device directly using the memory mapping; and
wherein the application is configured to flush sensitive data from micro architectural components of the computing device when the application stops executing the sensitive code.

20. The operating of claim 19, wherein the operating system further causes the one or more processors to create the memory mapping between a virtual address space of untrusted regions of the memory and the memory of the at least one other computing device.

* * * * *